May 18, 1965     R. H. IRISH     3,184,730

INTRUSION DETECTION SYSTEM

Filed July 30, 1962     2 Sheets-Sheet 1

May 18, 1965 R. H. IRISH 3,184,730
INTRUSION DETECTION SYSTEM
Filed July 30, 1962 2 Sheets-Sheet 2

United States Patent Office 3,184,730
Patented May 18, 1965

3,184,730
INTRUSION DETECTION SYSTEM
Robert H. Irish, 1900 Newkirk Ave., Brooklyn 26, N.Y.
Filed July 30, 1962, Ser. No. 213,380
7 Claims. (Cl. 340—258)

The present invention relates to an intrusion detection system of the fence or screen type and more particularly to a system for providing an alarm when an intruding object enters a designated area.

There are many different electrically and electronically operated intrusion detection systems which have been used heretofore. Some systems employ the photo-electric beam principle, the interruption of the beam causing a signal to be provided. Since each beam is capable of covering only a very limited area and since the system usually depends on the transmission of light, this system is subject to serious disadvantages inherent from changing weather conditions, such as reduced visibility from fog and rain.

Other systems employ a capacitive fence principle. However, these are subject to frequent false signals resulting from conditions which change the dielectric medium in which the system operates. In addition, the system may be affected by changes in the capacitance of its elements caused by rain, snow, small animals, and the like, each of which might set off an undesired false alarm.

Still other prior art systems operate on a radio frequency fence principle. These detect changes in the electric field pattern between one or more wires and therefore are subject to the same limitations inherent in the capacitive fence system.

Some systems employ a microwave Doppler principle. However, these are expensive if used for perimeter protection of a large area since many units would be required. In addition, the system is subject to false signals from objects which are not necessarily intruding objects, but only adjacent to the protected area. Ultrasonic Doppler systems are subject to the same limitations as are inherent in the microwave Doppler alarm system and the ultrasonic Doppler system can only be used effectively in areas that have no air movements.

Finally, systems which employ direct current screens or foil circuits and the like may be easily tampered with by removing part of the circuit and are therefore subject to being defeated easily.

Accordingly, it is seen that the various systems and devices heretofore employed have exhibited certain inherent limitations and disadvantages. Moreover, it has been difficult to provide an inexpensive, trouble free, flexible intrusion detection system adaptable to be employed for a variety of purposes.

The present invention is based on the principle that when alternating current flows through a conductor it sets up an alternating magnetic field in the immediate vicinity thereof. If a second conductor is located in the alternating magnetic field, a voltage will be induced in the second conductor. The amplitude of the induced voltage will depend, essentially, upon the conductor material, the amplitude and frequency of the energizing current, the medium and distance between the two conductors and the general spacial relationship between the conductors. The closer the conductors are to each other and the more nearly parallel, the greater will be the amplitude of the induced voltage. By placing the conductors in a prearranged array across the area to be protected from intrusion, a predetermined voltage will be induced in the displaced with respect to another conductor, as would be conductors. If any section of the conductors is physically necessary to permit access to an intruder, the induced voltage would be changed. This change could be employed to operate a signalling device warning of the undesired intrusion.

The present invention is particularly useful and advantageous in that it is not affected by objects in the general vicinity of the zone of protection unless these objects have a substantial permeability. Since rain, snow and fog do not differ in their magnetic properties from that of free space, the system will be equally effective in all kinds of weather conditions.

The present invention employs, as a particularly important novel feature, the use of circuit loops of a conductive element, sections of which are interlaced across the zone or area to be protected in a manner such that an intruder would be required to displace portions of the loop sections with respect to one another. The system is inexpensive since the wire loops are served by one electronic detection unit.

The system embodied in the invention is tamper-proof, since the unit detects changes in geometry as well as changes caused by removing part of the structure.

The invention is equally adaptable to protect or warn against the intrusion into an extremely large area, such as intrusion through a fence around the perimeter of a large area devoted for industrial purposes, and to protect against the unauthorized entrance through a small area, such as a window.

Of further importance is a novel feature of the invention which enables warning of the unauthorized intrusion through movable closures, such as doors and the like.

The invention is also adaptable to minimize false alarms which may be caused by the intrusion of small animals and birds.

In general, the system described herein for practicing the present invention involves the use of one or more closed circuit loops of electrically conductive material, sections of the loops being arranged in a particular pattern or array across the area desired to be protected against intrusion. The array is such that in order for an intrusion by a predetermined type of intruder to occur, it would be necessary for the intruding object to displace or disturb the relationship of the sections of the electrically conductive loops with respect to eath other.

In the preferred embodiment, two circuit loops, insulated from each other, may be employed, the first being referred to hereinafter as the primary loop and the second being referred to hereinafter as the secondary loop. The primary loop is connected to a source of alternating current. The secondary loop is disposed in a pattern such that sections of the secondary loop are parallel to sections of the primary loop and located in the magnetic field set up by the primary loop. Thus, a voltage is induced in the secondary loop by the changing magnetic field of the primary loop, the amplitude of the induced voltage being related to the distance between the conductive elements and the magnitude of the magnetic field acting on the conductive elements. The induced output voltage of the secondary loop is applied to a resonant circuit, tuned to the selected frequency of the alternating current source. The output of the resonant circuit may then be coupled to a detection circuit which may incorporate an amplifying network and a full wave rectifier. The output of the detection circuit may then be employed to operate a signal device, either audio or visual. The system is set up in a manner such that the signal device is inoperative when the loop patterns are disposed in the desired array. However, if any portion of a section of the conductive elements across the zone of protection is displaced more than a predetermined distance, the amplitude of the induced voltage in the secondary loop is changed sufficiently to cause the signalling device to operate. The signalling device is part of a circuit which is operated by either an increase or a decrease in the output of the detection circuit. Thus any movement of one or more sections of the conductive loops in a manner which would cause the inductive coupling to increase or decrease more than a predetermined amount would cause the signalling device to be operated. Moreover, a break in the power supply, alternating current source or any of the loops would cause the output of the secondary loop to change thereby setting off the signalling device.

Accordingly, the invention comprises the intrusion detection system possessing the features, properties, and the relation of the components which will be exemplified in the system hereinafter described, and the scope of the invention will be indicated in the claims.

For a fuller understanding of the nature and objects of the invention, reference should be had to the following detailed description taken in connection with the accompanying drawings in which like numerals of reference indicate corresponding parts and in which.

Figure 1:
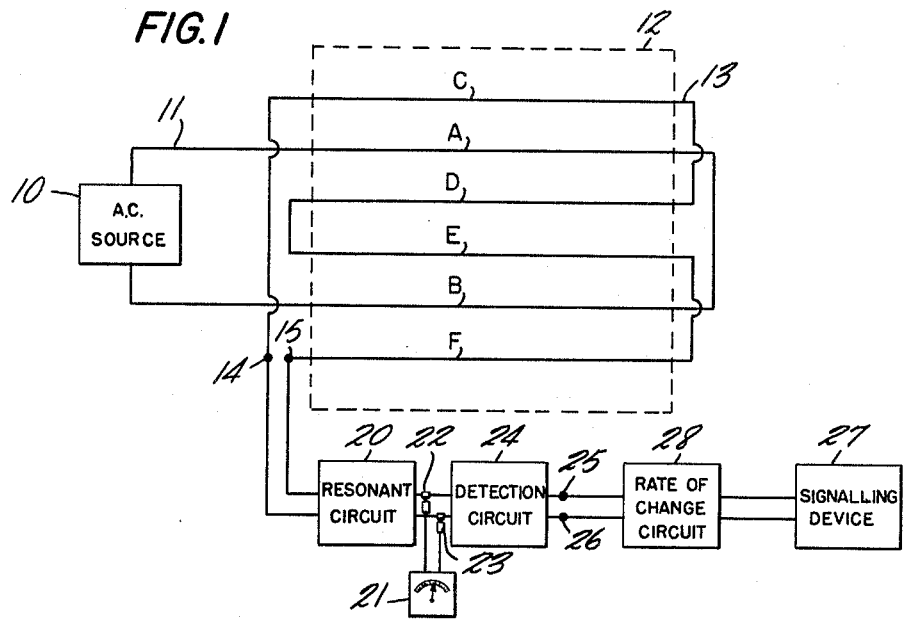
FIGURE 1 is a composite diagram illustrating the employment of a primary and secondary loop arranged in a desired array to warn of an undesired intrusion into a specified area, and a block diagram of the electrical circuits showing their relationship.

Referring to FIGURE 1, an alternating current source 10 operating at a selected frequency is connected to a primary circuit loop 11 made of electrically conductive attenuated material. Loop 11 may consist of tensioned wire, foil, a rod or the like and should have a low resistance to minimize power consumption. The alternating current source 10 may be any fixed or variable frequency generator capable of delivering an alternating current output of a predetermined magnitude and at a predetermined frequency. Loop 11, as shown in FIGURE 1, is composed of two sections identified as A and B.

The zone 12 desired to be protected against intrusion is indicated in FIGURE 1 as rectangular in shape, the perimeter of which is designated by a dotted line. It is understood, however, that the zone of protection may be of any desired shape or area. The secondary loop 13, also comprising electrically conductive attenuated material such as wire, foil, or the like, is shown comprised of sections C, D, E and F which are sections extending parallel to and spaced apart from sections A and B of primary loop 11. The interlacing pattern of primary loops 11 and 13 is such that a person or object whose intrusion into zone 12 is undesired, would of necessity, upon attempted intrusion, cause the sections of the loops or portions thereof to be displaced from the normal array indicated in the drawings. If, for example, the zone 12 represents a long enclosed fence surrounding a large industrial area, the spacing between the sections of the loops would be such as to permit small animals or birds to pass therebetween without displacing any of the sections with respect to one another. However, the spacing between the sections is close enough to prevent an undesired type of intruder such as a person or other object from gaining access through the fence without displacing the sections of the loops at least by a predetermined distance. Thus, the normal array forms a physical barrier across the area to be protected and the normal spaced apart relationship of the adjacent sections of the loops is a distance $d$ which is less than the minimum size required by an attempted intrusion of a predetermined type of intruder. Upon displacement by an intruder of at least a portion of one of the loops from its normal position by a distance less than the distance $d$, in order to gain access to the protected area, inductive changes occur in the coupling between the primary and secondary loops which ultimately actuate an indicator or signalling device.

The induced output voltage in the secondary loop 13 may be measured across output terminals 14 and 15 which is applied to a resonant circuit 20, tuned to the selected frequency of operation of the alternating current source 10. Actual tuning of the resonant circuit 20 may be accomplished conveniently by placing a voltmeter 21 across the resonant circuit output terminals 22 and 23 and tuning the resonant circuit 20 for a maximum voltage indication.

When the alternating current source 10 energizes the primary loop 11, an electromagnetic field is set up in the vicinity of sections A and B of loop 11. Secondary loop 13 has its sections C, D, E, and F arranged to be located within the electromagnetic field set up by primary loop 11. Consequently, as the field created by primary loop 11 changes, a voltage is induced in sections C, D, E, and F of the secondary loop 13. Preferably, the secondary loop sections are comprised of conductive material having a low resistance and high permeability so that the voltages induced therein are maximized. The sections of the secondary loop 13 are arranged in a physical pattern or array to be interlaced with sections A and B of the primary loop 11 and, as shown in FIGURE 1, the induced voltage in each of the sections C, D, E and F tend to cancel each other. It is understood that an array can be set up having induced voltages which are additive.

The resonant circuit 20 comprises a matching network and is tuned for maximum output. The output of the resonant circuit 20 is applied to the detection circuit 24 which includes the necessary amplifying stages and preferably a rectifier to convert the alternating current to direct current. The output voltage from the detection circuit 24 appears at the terminals 25 and 26 and is proportional to the magnitude of the induced voltage between terminals 14 and 15 of the secondary loop 13.

The output of the detection circuit 24 is then coupled to a signalling device 27. The total of the voltage induced in the secondary loop would be detected by the detection circuit 24. Since for the array shown in FIGURE 1 the induced voltages cancel each other, under ordinary operating conditions there would be no voltage across terminals 14 and 15. Other suitable array patterns may be employed which would provide a known output. However, the signalling device 27 is adjusted so that only a change, either an increase or a decrease, in the output of the detection circuit 24, causes the signalling device to be operated, thereby providing a warning that the relationship of the sections of the primary and secondary loops have been disturbed by more than a predetermined amount. If desired, a differentiator circuit, also known in the art as a rate of change circuit 28, may be connected between the output of the secondary loop and the signalling device. The rate of change circuit 28 is one which has an output proportional to the time derivative of its input. In FIGURE 1, the rate of change circuit 28 is shown connected between the detection circuit 24 and the signalling device 27 and is designed and operates in a manner such that very slow changes in the output of the detection circuit are absorbed by the rate of change circuit thereby preventing the signalling device from operating for magnitude changes of less than a predetermined minimum with respect to time. A rate of change circuit may be employed to compensate for drifting and other very slowly changing output conditions of the alternating current source. The rate of change circuit therefore prevents false alarms resulting from slowly changing electrical conditions within the circuit, but does not effect the efficiency of the intrusion detection system. It is understood that the system may contain a warning provision indicating if the source voltage changes more than a predetermined amount.

The actual detection circuits, signalling devices and rate of change circuits, have not been described herein because each is well known in the intrusion detection and burglar alarm art and may be adapted for use in the system of the invention by any person skilled in that art. One example of a typical detection circuit and signalling device is illustrated in United States Patent No. 2,181,648. Typical differentiator or rate of change circuits are shown and described in United States Patent Nos. 2,971,184 and 3,044,049. Differentiator circuits are also described in Jacob Millman, "Vacuum Tube and Semiconductor Electronics" (1958, McGraw-Hill).

It can be seen that the system of the invention will also operate to detect the intrusion through the zone of protection of any article of high permeability, such as metallic objects including tools, guns and the like. When such an object is placed between the sections of the inductively coupled loops, the magnitude of the inductive coupling is sufficiently affected to cause the secondary output voltage to change and to operate the responsive circuits in the same way that they would be operated had the sections been physically displaced with respect to each other.

Figure 2:
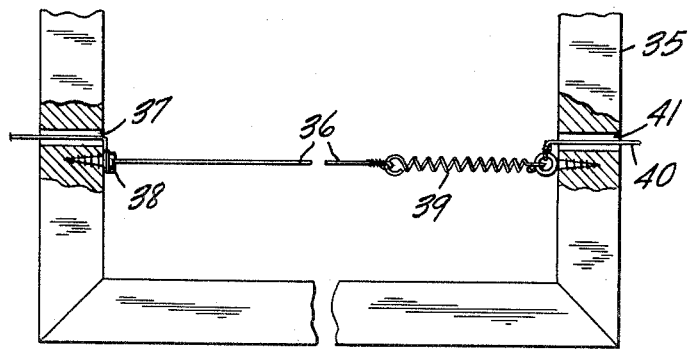
FIGURE 2 is a plan view illustrating means for physically mounting sections of the conductive loops across a framed opening.

In FIGURE 2, there is shown a preferred means for mounting the electrically conductive loop elements. Frame 35 represents the perimeter of the area to be protected against intrusion and may, for example, consist of a window, fence, or other frame which covers the area to be protected. The sections of the loop elements, one of which is identified as numeral 36, are extended across the frame covering the area to be protected in the manner heretofore described. The section of the element may be threaded through an opening 37 in one end of the frame 35 and anchored to the frame by means of a screw 38. The element is then extended across the zone of protection to one end of a helical spring 39, the other end of the helical spring being anchored to the other end of the frame 35. Helical spring 39 preferably is made of electrically conductive non-magnetic material, such as beryllium bronze, to avoid the possibility of inducing a voltage in the helical spring. The primary purpose of the helical spring 39 is to maintain the proper tension on the section 36 of the loop element so that small animals or birds which may rest on the loop section 36 will not appreciably displace it in relation to other sections of the loop elements. The helical spring 39 may, of course, be located at one end of the section 36 or, if desired, it may be centrally located. The electrical circuit is completed by electrically connecting the helical spring 39 to a wire 40 which is threaded through another opening 41 in the frame 35. Wire 40 is then connected to an appropriate section (not shown) of the loop element which laces back across the frame to provide the required array across the zone of protection. Although the foregoing is a preferred means for mounting the electrically conductive loops, it is understood that this is merely illustrative and that other suitable means could be utilized in lieu thereof.

Figure 3:
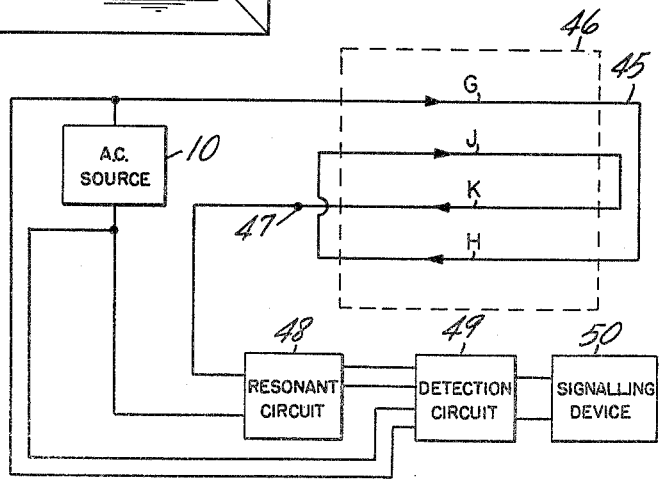
FIGURE 3 is a composite diagram showing the system of the invention employing a single loop having sections thereof in inductive relationship, and a block diagram of the electrical circuits arranged to provide a signal upon disturbing the sections of the loop by more than a predetermined amount.

Another embodiment of the invention is shown in FIGURE 3 which illustrates the employment of a single loop of a conductive element instead of the employment of primary and secondary loops. Alternating current source 10 is connected to section G of the loop element 45. Although loop element 45 consists of only a single circuit loop, it is laced back and forth across the zone of protection 46 to provide a predetermined normal array of sections of the loop element 45 having a predetermined spaced apart relationship, the spacing being of less than the minimum size required by the attempted intrusion of a predetermined type of intruder to gain access to the area to be protected. The sections of the loop G, H, J and K, across the zone of protection 46, are substantially parallel to each other to provide maximum inductive coupling between the sections.

The array is set up so that physical displacement of a section thereof will not cause equal and opposite or self balancing changes in the induced voltages of adjacent sections. For a two section array, no self balancing change is possible. For three or more sections laced across the zone of protection, self balancing changes may be avoided by an array in which the current flowing in any intermediate section is in the same direction as the current flowing in an adjacent section on one side thereof and in the opposite direction as the current flowing in an adjacent section on the other side thereof. A suitable array is shown in FIGURE 3, where the direction of the current at one particular instant of time is indicated by the arrows. Section G connects across the upper portion of the zone 46 to the section H which is laced back across the lower portion of the zone 46. The terminal end of section H is then connected to section J which lies adjacent to section G. Section J is then extended across the zone of protection 46 substantially parallel and adjacent to section G and connected to section K which laces back across the zone of protection. It will be seen that the current flowing in section J, for example, is in the same direction as that flowing in section G but in the opposite direction to the current flowing in section K.

The terminal end of loop 45, represented by terminal 47, is connected to circuit responsive means, which may include the resonant circuit 48 through which the electrical circuit is completed back to the alternating current source 10.

The output of the resonant circuit 48 may be applied to a detection circuit 49. In FIGURE 3, additional means are suggested for compensating the responsive circuits for any change in current output of the alternating current source 10. This is accomplished by applying the output of the alternating current source to one input of the detection circuit 49. Detection circuit 49 may include comparator circuits or difference amplifiers which are capable of comparing the output of the resonant circuit 48 with the output of the alternating current source 10 and then detecting whether the proportion of voltage change in the output of resonant circuit 48 is different from the proportion of the change of alternating current source 10. Comparator circuits of this character are well known in the electronics art and are described in Jacob Millman, Vacuum Tube and Semiconductor Electronics (1958, McGraw-Hill).

In this manner, if the magnitude of the alternating current source should change for any reason, the magnitude of the voltages induced in the sections of the loop 45 would also change by a proportional amount. Consequently, the output of the resonant circuit 48 would be changed. Without facilities to compensate for such change, it is possible that the signalling device would be operated if the change were of sufficient magnitude. However, by including the comparator circuit, the change in the output of the resonant circuit 48 is compared with the change in the alternating current source 10 and if the change is approximately of the same proportion, detection circuit 49 is set up so that the signalling device 50 is not operated.

If, however, the change in the induced voltage in the sections of the loop element 45 are not a result of changes in the alternating current source 10, which would be the case if the loop element is physically displaced in any manner, then only the output of the resonant circuit 48 would be changed and the detection circuit 49 would sense this and actuate the signalling device 50.

It is understood that this circuit arrangement, employing comparator circuits, could be applied equally as well where both a primary and secondary loop element is employed as described in FIGURE 1.

Figure 4:
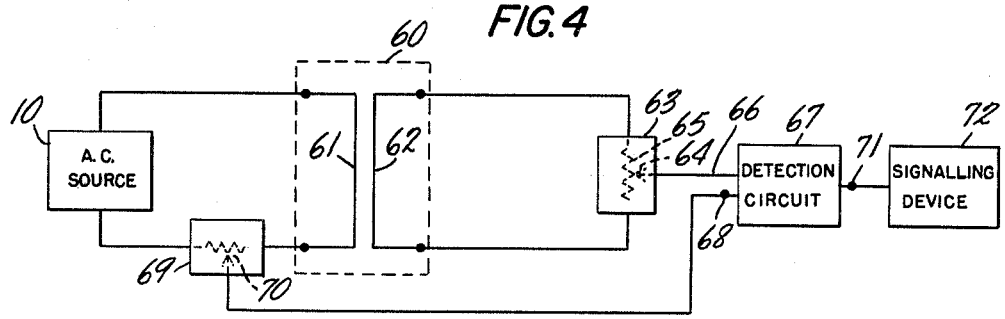
FIGURE 4 is a block diagram of the system of the invention including means for avoiding false signals from amplitude changes in the alternating current source.

In FIGURE 4, there is suggested still another embodiment of the invention illustrating in a general way how compensating means is employed to correct for possible false signals resulting from changes in the alternating current source 10. Zone of protection 60 is covered by the predetermined normal array of primary loop 61 and secondary loop 62, shown symbolically in FIGURE 4. The output of the secondary loop 62 is applied to resonant circuit means 63 which comprises a matched impedance thereby providing the maximum voltage drop thereacross. An adjustable arm 64 may be provided to tap off a portion of the voltage across load 65, incorporated within the resonant circuit means 63. The arm 64 is connected to one input 66 of the detection circuit 67. Another input 68 to detection circuit 67 is connected to a load 69 which is in the primary loop circuit. An adjustable arm 70 taps a portion of the voltage across load 69. Detection circuit 67 includes the necessary amplifying devices, comparator circuits and rectifying circuits, all of which are well known to those skilled in the art. If desired, the comparator circuit may be in the form of a bridge circuit, the voltage tapped from load 65 being balanced against load 69.

In operation, under normal conditions, the voltage applied to input 68 is balanced gainst the voltage applied to input 66. If the alternating current source 10 changes in value, a proportional change would occur in the voltage output from the secondary loop 62. Accordingly, the voltage applied to the input 68 of the detection circuit 67 will change in the same manner as the voltage applied to input 66 of the detection circuit 67 and the two voltages will still cancel each other. However, if the change in the output voltage from secondary loop occurs because of the physical displacement of loop 61 with respect to loop 62, then only the voltage applied to input 66 of the detection circuit 67 will be substantially affected. Detection circuit 67 will detect the change in relationship between its two inputs and will produce a voltage at its output 71 which is capable of operating the signalling device 72.

If desired, the detection circuit 67 can be set up so that it will be responsive only to percentage changes at one of its inputs which exceed, by a predetermined amount, the percentage change at its other input. Or, it may be desirable to set up the intrusion detection system such that the detection circuit 67 makes comparisons between the absolute voltages applied to its two inputs and produces a signal only when the difference exceeds a predetermined magnitude.

Figure 5:
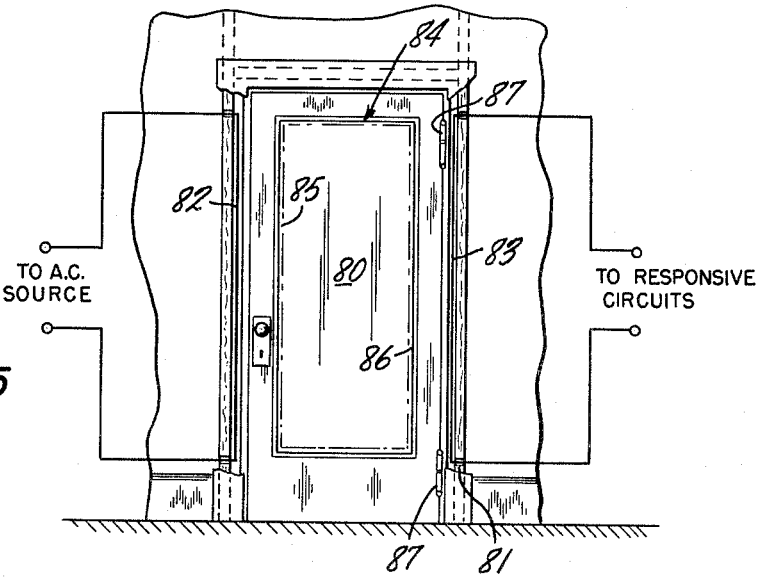
FIGURE 5 is an elevational view of a door mounted in a stationary frame illustrating the physical location of the primary, secondary and intermediate loops with respect to the doorway.
Figure 6:
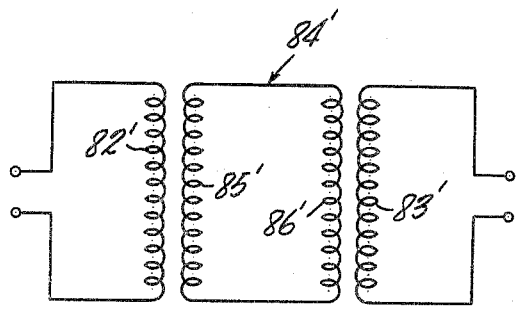
FIGURE 6 illustrates schematically the electrical counterpart of the intrusion detection system shown in FIGURE 5.

In FIGURE 5, there is shown means to provide intrusion detection in connection with the unauthorized operation of a movable object, such as a door 80, within a stationary frame 81. Primary loop 82 is extended longitudinally along the stationary frame 81 adjacent to the edge of the door 80. Secondary loop 83 is extended longitudinally along the stationary frame 81, but on the side of the stationary frame 81 opposite from the side on which the primary loop 82 is disposed. Mounted on the door 80 an intermediate closed circuit loop 84 which extends around the door in a manner such that one section 85 of loop 84 is stretched substantially parallel and adjacent to a section of primary loop 82 while another section 86 of the intermediate loop 84 is disposed substantially parallel and adjacent to a section of secondary loop 83. The symbolical electrical equivalent of the circuit just described is shown in FIGURE 6 illustrating how primary loop 82' is coupled to section 85' of intermediate loop 84' and section 86' of loop 84' is coupled to secondary loop 83'.

Under normal conditions, the door is closed and the induced voltage in the secondary loop 83 is of a predetermined magnitude. However, when door 80 is opened by an unauthorized intruder by rotating it on its hinges 87, section 85 of the intermediate loop 84 is displaced substantially from the primary loop 82, thereby reducing the coupling between the primary loop 82 and intermediate loop 84. Since the only source of voltage orginates from the primary loop 82, the induced voltage in section 85 will be substantially reduced by the opening of door 84. This, in turn, will cause the output voltage from secondary loop 83 to be substantially reduced correspondingly and the change in the secondary loop output voltage will cause the signalling device to be operated in the manner heretofore described.

It is seen that the arrangement shown in FIGURE 5 does not entail special connections, slip rings or the like, since each loop is electrically separate and independent from any other loop. The intermediate loop 84 requires no external electrical connections and therefore may be mounted directly on the door 80. It is understood that the use of an intermediate loop between the primary and secondary loops can also be adapted for use with fence type intrusion detection systems and the like.

Another variation of the invention may be provided in which the alternating current source is an oscillator having the primary loop circuit comprising a portion of the inductive electrical element which determines the selected frequency at which the source of alternating current operates. The inductance of the primary loop is a function of the mutual inductance established by the relationship of the primary and secondary loops. Thus, when the secondary loop is displaced with respect to the primary loop, a change in mutual inductive coupling, between the loops occurs. This results in a change in the effective inductance of the primary loop, thereby changing the frequency at which the oscillator is operating. Therefore, the frequency of the alternating current supplied to the primary loop is changed. However, the resonant circuit means to which the secondary loop is connected, is still tuned to the original predetermined selected frequency. Since the primary loop is no longer operating at the same frequency as that to which the secondary loop circuit is tuned, a substantial change in voltage output of the secondary will be produced, which change will assist in causing the signalling device to be operated.

The alternating current source described herein may be a master oscillator power amplifier. The preselected operating frequency may be any frequency within a wide range, the frequency actually selected being dictated only by practical considerations. If the frequency is too high, the primary loop may act as a transmitter, especially if the length of any of the sections begins to approach the wave length of the operating frequency. If the frequency is too low, there may be difficulties arising from audio interference. In addition, the employment of a low frequency requires a correspondingly higher amperage output from the alternating current source. I have found that frequencies between 2 kilocycles and 500 kilocycles and an alternating current having a magnitude between 10 amperes and one hundred milliamperes may be employed satisfactorily. Where the primary loop section is ten feet long and has flowing therein an alternating current of the order of magnitude of one ampere R.M.S., operating at a frequency of 100 kilocycles, a voltage of the order of 160 millivolts will be induced in a parallel section of a secondary loop of copper wire ten feet in length and normally separated from the primary by eight inches. A change in the distance between the wires of one inch at any one point in the parallel sections of wire will produce a change in induced voltage in the secondary wire in the order of ten millivolts. A change of this magnitude can be amplified and employed to operate the signalling device.

Theoretically, for a frequency of approximately 2 kilocycles, the current in a primary loop circuit should be approximately 10 amperes to permit a normal wire separation from the secondary loop sections of approximately 20 centimeters. Under these conditions, a voltage of approximately 10 millivolts will be induced in a length of copper wire 2 meters long. For a change in separation of approximately 2 centimeters between sections of the loops at their central point, a change of approximately 0.52 millivolt would occur in the output voltage of the secondary loop. Increasing the frequency, length of wire or the magnitude of the inducing current, or decreasing the separation between wires would cause the normal output voltage of the secondary loop to be increased, thereby magnifying changes arising from the corresponding displacement of the loops with respect to each other.

It will thus be seen that the objects set forth above, among those made apparent from the preceding description, are efficiently attained and, since certain changes may be made in carrying out the systems set forth without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. An intrusion detection system, comprising, in combination, a source of alternating current operating at a selected frequency, a primary circuit loop of electrically conductive attenuated material connected to the source of alternating current, a secondary circuit loop of electrically conductive attenuated material, an intermediate closed loop of electrically conductive attenuated material disposed between the primary loop and the secondary loop, said intermediate loop having a section inductively coupled to a section of the primary loop and a section inductively coupled to a section of the secondary loop, said loops being arranged in a predetermined normal array across an area to be protected from intrusion, said array comprising sections of the loops having a predetermined spaced apart relationship such that displacement of a section of a loop by more than a predetermined distance is required by the attempted intrusion of a predetermined type of intruder to gain access to the area to be protected, said array having loop sections in substantially parallel relationship, thereby providing inductive coupling between said loop sections, and circuit responsive means coupled to the output of the secondary loop and adapted to be responsive to changes in the output voltage of said secondary loop caused by physical displacement of said inductively coupled sections to more than a predetermined distance.

2. An intrusion detection system as defined in claim 1 for use in warning of the unauthorized operation of a moveable object within a stationary frame in which the primary loop is mounted on one side of a stationary frame, the secondary loop is mounted on a different side of the stationary frame and the intermediate closed loop is mounted on a moveable object within the stationary frame thereby inductively coupling said primary loop to said secondary loop through said intermediate loop.

3. An intrusion detection system comprising, in combination, a source of alternating current operating at a selected frequency, a primary closed circuit loop of electrically conductive attenuated material connected to the source of alternating current, a secondary closed circuit loop of electrically conductive attenuated material, means to support said loops in a predetermined normal array and forming a physical barrier across an area to be protected from intrusion, said array comprising sections of the loops having a normal predetermined spaced apart relationship therebetween of distance $d$, said distance $d$ being less than the minimum size required by attempted intrusion of a predetermined type of intruder to gain access to the area to be protected, and at least a portion of each loop section being manually displaceable from any other loop section, said array having the primary loop sections in substantially parallel relation with the secondary loop sections thereby providing inductive coupling between said sections of the primary and secondary loops, an indicator and circuit responsive means coupled between the output of the secondary loop and said indicator and responsive to inductive changes in the coupling between the primary and secondary loops caused by the physical displacement of at least a portion of one of said loops by a distance equal to less than the said distance $d$ from its normal position to actuate the indicator.

4. An intrusion detection system comprising, in combination, a source of alternating current operating at a selected frequency, a single electrically conductive attenuated closed circuit loop element connected to the source of alternating current, means to support said loop element in a predetermined normal array and forming a physical barrier across an area to be protected from intrusion, said array comprising sections of the loop element having a normal predetermined spaced apart relationship therebetween of distance $d$, said distance $d$ being less than the minimum size required by attempted intrusion of a predetermined type of intruder to gain access to the area to be protected, and at least a portion of each loop section being manually displaceable from any other loop section, said sections of the loop element being in substantially parallel relation thereby providing inductive coupling between the sections of the element, circuit means tuned to the selected frequency and associated with the loop element, said circuit means being adapted to have a predetermined voltage drop thereacross when the loop element is disposed in the normal predetermined array, a detection circuit adapted to be responsive to a change in voltage drop across said circuit means, and signalling means operable by said detection circuit responsive to inductive changes in the coupling between sections of the loop element caused by physical displacement of at least a portion of one of said loop sections by a distance equal to less than the said distance $d$ from its normal position to actuate the signalling means.

5. The intrusion detection system defined in claim 3 in which the circuit responsive means includes a rate of change circuit adapted to cause the circuit responsive means to be responsive only to changes in the voltage output of the loop means which exceed a predetermined rate with respect to time.

6. The intrusion detection system defined in claim 3 in which the selected frequency is a frequency in the range between 2 kilocycles and 500 kilocycles and the source of alternating current provides a current flowing in the primary loop in the range between 100 milliamperes and 10 amperes.

7. The intrusion detection system defined in claim 3 in which the circuit responsive means includes a resonant circuit and a detection circuit, the resonant circuit being coupled to the output of the secondary loop, the output of the resonant circuit being applied to one input of the detection circuit, a second input of the detection circuit being connected to the source of alternating current, the detection circuit being adapted to compare the voltage level at its first and second inputs and to be responsive only to predetermined changes in voltage differences between said first and second inputs and said indicator being operable by said detection circuit whereby changes in the amplitude of the source of alternating current are ineffective to provide a signal but physical displacement of at least a portion of one of said loops by a distance equal to less than the said distance $d$ from its normal position does provide a signal.

(References on following page)

References Cited by the Examiner

UNITED STATES PATENTS

| | | | |
|---|---|---|---|
| 1,524,429 | 1/25 | Gewecke | 179—82 |
| 1,610,692 | 12/26 | Logwood | 340—38 |
| 1,971,549 | 8/34 | Woodward | 340—258 |
| 2,355,395 | 8/44 | Rubenstien | 340—258 |
| 2,814,032 | 11/57 | Agnew | 340—213 |
| 2,956,269 | 10/60 | Schmidt | 340—258 |
| 2,971,184 | 2/61 | Pearson et al. | 340—258 |

FOREIGN PATENTS 763,681 5/34 France.

NEIL C. READ, *Primary Examiner.*